United States Patent
Krainer et al.

(10) Patent No.: US 6,872,854 B2
(45) Date of Patent: Mar. 29, 2005

(54) COMPLEXES OF METAL SALTS OF ORGANIC ACIDS AND BETA-DIKETONES AND METHODS FOR PRODUCING SAME

(75) Inventors: Edward Krainer, Lynbrook, NY (US); Michael H. Fisch, Wayne, NJ (US); Ulrich Stewen, Bedford, NY (US); Radu Bacaloglu, Hamburg, NY (US); Ilze Bacaloglu, Hamburg, NY (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 10/190,130

(22) Filed: Jul. 3, 2002

(65) Prior Publication Data

US 2004/0006171 A1 Jan. 8, 2004

(51) Int. Cl.[7] ............................................. C08B 41/06
(52) U.S. Cl. ..................... 568/314; 568/315; 568/346; 568/347; 568/388; 568/391; 524/567; 428/341
(58) Field of Search ................................. 568/314, 315, 568/346, 347, 388, 391; 524/567; 428/341

(56) References Cited

U.S. PATENT DOCUMENTS

| | | | |
|---|---|---|---|
| 4,252,698 A | 2/1981 | Ito et al. | |
| 4,482,745 A | * 11/1984 | Maulding | ................... 568/314 |
| 5,756,570 A | 5/1998 | Hoch et al. | |
| 5,880,189 A | 3/1999 | Croce et al. | |
| 6,362,264 B1 | 3/2002 | Bae | |

OTHER PUBLICATIONS

Bacaloglu et al., "Study of PVC Degradation Using a Fast Computer Scanning Procedure", *J. of Vinyl & Additive Tech.*, vol. 7, No. 3, pp. 149–155 (2001).

* cited by examiner

*Primary Examiner*—Tatyana Zalukaeva
*Assistant Examiner*—Satya Sastri
(74) *Attorney, Agent, or Firm*—Michael P. Dilworth (57) ABSTRACT

Metal salts of organic acids complexed with β-diketone compounds are multifunctional complexes useful in the formulation of stabilizers for halogenated resins. These complexes may be used jointly with other low toxicity intermediates, such as zinc or magnesium intermediates, to form effective stabilizers that are non-toxic and exhibit better performance than other known stabilizers, including those containing toxic heavy metals such as cadmium or lead. The complex is prepared utilizing a Claisen condensation reaction and precipitation with water and heptane.

7 Claims, 8 Drawing Sheets

Figure 2

Figure 3 Wire jacketing
Static thermal stability at 204°C

Figure 4

Figure 5 Automotive Interior
Static thermal stability at 190°C

Figure 6 Automotive low fog
Static thermal stability at 204°C

Figure 8

COMPLEXES OF METAL SALTS OF ORGANIC ACIDS AND BETA-DIKETONES AND METHODS FOR PRODUCING SAME

BACKGROUND OF THE INVENTION

1. Field of the Invention

This invention relates to complexes useful in the formation of stabilizer additives for halogen-containing polymers such as polyvinyl chloride (PVC).

Metal salts of organic acids complexed with β-diketone compounds, such as calcium benzoate 1,3-diphenylpropane-1,3-dionate (CBDBM), are useful in the formulation of stabilizers for halogenated resins and, when used jointly with other low toxic intermediates, such as zinc or magnesium intermediates, can form effective stabilizers with low toxicity and better performance than other known stabilizers, including those containing toxic heavy metals such as cadmium and lead. Pursuant to the present invention, these stabilizer complexes are prepared utilizing a Claisen condensation reaction and precipitation with water and heptane.

2. Description of the Related Art

Halogen-containing resins, particularly polyvinyl chloride resins, are inherently unstable to heat and decompose through a dehydrohalogenation reaction at the time of processing, when exposed to high temperature, or upon exposure to sunlight, etc. The result of this decomposition includes discoloration, degrading of mechanical properties, and other objectionable changes in the physical properties of the finished product.

Attempts have been made to improve the thermal stability of halogenated resins by adding stabilizers such as metal salts of organic acids, inorganic basic metal compounds, organotin compounds, organic phosphites, epoxy compounds or β-diketones thereto. Stabilizers ensure satisfactory thermal stability during processing at high output rates.

Many stabilizers used in the past contained barium, cadmium and/or lead. Due to their toxicity, there is a strong interest in replacing these heavy metals with non-toxic stabilizers, such as those containing calcium and zinc. Non-toxic stabilizers that have been used include combinations of organic acid zinc salts, organic acid alkaline earth metal salts, organotin compounds, organic phosphite esters, epoxy compounds, antioxidants, polyols, etc. Among these non-toxic stabilizers, potassium, calcium or magnesium salts of organic acids have been used as a fundamental stabilizer for halogenated resins.

Although stabilizers comprising potassium, calcium or magnesium salts of organic acids are effective in avoiding fast degradation of a halogenated resin over a prolonged period of time insuring good long term stability, they are less effective with respect to discoloration, particularly discoloration in the initial stage of heating.

β-diketone compounds are known co-stabilizers in the presence of zinc compounds which overcome objectionable discoloration of halogenated resins. Methods for producing β-diketones are also known in the art. For example, U.S. Pat. No. 4,482,745 discloses a method for synthesizing 1,3-diphenyl-1,3-propanedione by reacting acetophenone with methyl benzoate in the presence of calcium oxide. The 1,3-diphenyl-1,3-propanedione may then be utilized to produce herbicidal agents such as 1,2-dimethyl-3,5-diphenylpyrazolium methyl sulfate.

β-diketones are also used in conjunction with zinc carboxylates in a series of chlorinated polymer stabilizers.

For example, U.S. Pat. No. 5,756,570, the contents of which are incorporated by reference herein, discloses an electrical grade polyvinyl chloride resin composition which avoids the use of lead-based stabilizers. U.S. Pat. No. 5,756,570 discloses many heat stabilizers that exclude cadmium and lead and includes epoxides, salts of monocarboxylic acids (including zinc salts), phenolic antioxidants, organic phosphates, and β-diketones.

U.S. Pat. No. 4,252,698, the contents of which are incorporated by reference herein, provides an anti-yellowing additive for PVC resins which includes at least one overbased sulfonate or phenolate compound of lithium, sodium, potassium, magnesium, calcium, strontium, barium, zinc, titanium, aluminum, zirconium, or tin, and a 1,3-diketone compound having 5 to 30 carbon atoms or a lithium, sodium, potassium, magnesium, calcium, strontium, barium, zinc, aluminum, tin or zirconium salt thereof. Other stabilizers may also be employed with the stabilizer composition disclosed in the '698 patent to improve the overall effectiveness of the final stabilizer composition.

In addition, U.S. Pat. No. 5,880,189, the contents of which are incorporated by reference herein, discloses liquid PVC stabilizers and lubricants which are barium-zinc carboxylate salt mixtures.

U.S. Pat. No. 6,362,264, the contents of which are incorporated by reference herein, discloses a stabilizer for food contact and medical grade PVC that contains about 10–40 parts by weight of a zinc carboxylate, about 50–80 parts by weight of an alkyl ester of thiodipropionic acid and about 5–20 parts by weight of a phenolic antioxidant.

The non-toxic stabilizers noted above have certain disadvantages. The most significant disadvantage is their lower efficiency, as demonstrated by their unsatisfactory early color. The lower efficiency of calcium/zinc stabilizers results in a higher cost than lead or barium/zinc stabilizers because they require expensive additives as antioxidants, radical scavengers and others.

Moreover, the use of halogenated resins has recently become more diversified and thus the processing conditions and the environment for their use have become more and more severe, which makes the stabilizing effect of known stabilizers insufficient.

Thus it would be desirable to utilize a stabilizer system for a halogenated resin whereby the heat stability of the halogenated resin can be improved avoiding discoloration with greater efficiency utilizing non-toxic stabilizers.

SUMMARY OF THE INVENTION

Complexes of metal salts of organic acids in combination with β-diketone compounds, such as calcium benzoate 1,3-diphenylpropane-1,3-dionate (CBDBM), are efficient solid intermediates for halogenated resin stabilizers. When used jointly with other low toxicity intermediates, such as zinc or magnesium intermediates, these stabilizer complexes can replace previously used mixed metal stabilizers containing cadmium, lead and/or other heavy metal compounds.

The process for preparing these stabilizer complexes consists of a Claisen condensation of low cost raw materials, which include the following:

a) a ketone of structure:

where $R_1$ and $R_2$ can be selected from the group consisting of H, methyl, $C_1$–$C_{20}$ alkyl, $C_2$–$C_{20}$ alkenyl, aryl, aryl that is mono or poly substituted with $C_1$–$C_{15}$ alkyl, $C_1$–$C_4$ alkoxy, or arylalkyl;

b) an ester of structure:

where $R_4$ is selected from the group consisting of $C_1$–$C_5$ alkyl, aryl, and aryl that is substituted with $C_1$–$C_4$ alkyl, and $R_3$ is selected from the group consisting of aryl, substituted aryl, $C_1$–$C_{20}$ alkyl, and $C_2$–$C_{20}$ alkenyl;

c) a base such as calcium oxide, calcium hydroxide, barium oxide, barium hydroxide, potassium hydroxide, potassium oxide, sodium hydroxide, or sodium oxide; and d) a solvent such as an aromatic hydrocarbon, alkyl or aryl ether, dialkylsulfoxide, or the same ester used for the condensation.

The process does not involve the use of toxic or corrosive catalysts such as sodium methoxide, sodium amide, sodium hydride, and other similar compounds normally used in the manufacture of β-diketones.

The resulting stabilizer complexes can be combined with other low-toxic intermediates, such as those based on zinc. The resulting stabilizers are more efficient than known heavy metal stabilizers, without the toxicity associated with heavy metals. Another advantage of using the stabilizer complexes formed in accordance with the present invention in the formulation of halogenated resin stabilizers is that there is no need to add additional β-diketones such as 1,3-diphenylpropane-1,3-dione (also known as dibenzoylmethane (DBM)) to the stabilizer, which reduces costs of production.

Resins obtained with these stabilizers have enhanced heat stability and resistance to discoloration without the toxicity associated with other known stabilizers.

DETAILED DESCRIPTION OF THE INVENTION

In accordance with the present disclosure, halogen resins stabilized with a complex based stabilizer, the stabilizer complexes themselves, and methods for their production are disclosed.

The general process for the production of the complexes is a Claisen condensation of certain starting components and precipitation with water and heptane, utilizing:

a) a ketone of structure:

where $R_1$ and $R_2$ can be selected from the group consisting of H, methyl, $C_1$–$C_{20}$ alkyl, $C_2$–$C_{20}$ alkenyl, aryl, aryl that is mono or poly substituted with $C_1$–$C_{15}$ alkyl, $C_1$–$C_4$ alkoxy, or arylalkyl;

b) an ester of structure:

where $R_4$ is selected from the group consisting of $C_1$–$C_5$ alkyl, aryl, and aryl that is substituted with $C_1$–$C_4$ alkyl, and $R_3$ is selected from the group consisting of aryl, substituted aryl, $C_1$–$C_{20}$ alkyl, and $C_2$–$C_{20}$ alkenyl;

c) a base such as calcium oxide, calcium hydroxide, barium oxide, barium hydroxide, potassium hydroxide, potassium oxide, sodium hydroxide or sodium oxide; and d) a solvent such as an aromatic hydrocarbon, alkyl or aryl ether, dialkylsulfoxide, or the same ester used for the condensation.

In some embodiments, the reaction mixture is washed with water to remove any excess base or undesirable by-products formed during the reaction. The reaction mixture may also be washed with an organic solvent, such as heptane, to remove any excess ester from the stabilizer complex. Washing with water and an organic solvent will also help precipitate the stabilizer complex from the reaction mixture.

Preferably, the ketone is a methyl ketone possessing aliphatic or aromatic radicals such as acetophenone, stearylmethyl ketone, laurylmethylketone, palmitylmethylketone, caprylmethylketone, capronilmethylketone, caprilylmethylketone; the ester is a substituted alkyl benzoate or naphthenate, such as methyl benzoate, ethyl benzoate, an aliphatic ester, such as methyl stearate, and the base is calcium oxide, calcium hydroxide, barium hydroxide, barium oxide, potassium hydroxide, potassium oxide, sodium hydroxide, or sodium oxide.

In a preferred embodiment, the stabilizer complex is CBDBM. CBDBM can be prepared by mixing from about 0.25 to about 3.5 moles of acetophenone with from about 1 to about 20 moles of methyl benzoate in the presence of from about 0.25 to about 7 moles of calcium oxide at a temperature range of from about 150° to about 250° C. for from about two to about six hours under a nitrogen atmosphere. Methyl alcohol is continuously removed as it is formed. The CBDBM produced by this reaction is then precipitated by a successive addition of 0 to about 800 mL of water, 0 to about 800 mL of heptane, and 0 mL to about 550 mL of water. Washing with water removes $Ca(OH)_2$ formed during the reaction. Washing with a solvent such as heptane will remove any methyl benzoate from the CBDBM. Methyl benzoate is undesirable because it is volatile and therefore is inappropriate in a PVC stabilizer. The precipitate is then filtered under vacuum, washed with heptane, and dried to provide a CBDBM complex which is substantially free of unreacted calcium oxide and methyl benzoate.

Instead of calcium oxide, barium hydroxide, potassium hydroxide or sodium hydroxide may be utilized to form barium complexes, potassium complexes and sodium complexes respectively. Because of environmental concerns with respect to the use of barium, complexes utilizing other bases are preferred, with calcium oxide and/or calcium hydroxide being most preferred. In addition, similar stabilizer complexes can be obtained by the condensation of other esters, such as substituted alkyl benzoates and naphthenates, or aliphatic esters such as alkyl stearate, with methyl ketones possessing aliphatic or aromatic radicals. For example, an ethyl benzoate and a stearylmethyl ketone, or methyl stearate with acetophenone may be combined to produce a stearylbenzoylmethane complex.

The stabilizer complexes produced in accordance with the present invention are a multifunctional component of a halogenated resin, e.g. PVC, stabilizer. So, for example, where the complex is CBDBM, the calcium benzoate portion of the complex can act as an acid scavenger (e.g., HCl scavenger); the CaDBM portion of the complex can act as an HCl scavenger, an allylic chlorine scavenger, and a complexing agent for zinc or other metal stabilizer. In addition, since a β-diketone, DBM, is part of the CBDBM complex, there is no need to separately add β-diketone to the halogenated resin stabilizer, thereby reducing costs.

The stabilizer complexes produced in accordance with the present invention may then be combined with other components to form stabilizers useful for imparting enhanced heat stability and resistance to discoloration to a halogenated resin. These usually used components include low or non-toxic intermediates such as organic acid metallic salts, organic phosphites, organotin compounds, metal hydroxides, metal oxides, polyols, nitrogen-containing non-metallic compounds, epoxy compounds, etc. Further, it causes no inconvenience to compound, according to necessity, plasticizers, pigments, dyes, fillers, foaming agents, antistatic agents, anti-fogging agents, plate-out preventing agents, surface treating agents, lubricants, flame retardants, antioxidants, ultraviolet absorbers, crosslinking agents, fluorescence pigments, brighteners, fungicides, germicides, processing aids, impact modifiers, etc. The resulting stabilizers have better efficiency than heavy metal stabilizers without the toxicity associated with the heavy metals.

In general and for most applications, as a mixture with other low toxic intermediates, such amount of the complex can vary from about 2% to about 70%, preferably from about 4% to about 20%, and most preferably from about 5% to about 10% weight parts per hundred weight parts of the stabilizer. Those stabilizers may be used from about 0.5 to about 10, preferably from about 1 to about 7, and more preferably from about 1 to about 5 weight parts per hundred parts of halogen-containing resin (phr).

Examples of additional stabilizers that may be compounded with the stabilizer complexes of this invention are low toxicity stabilizers including metal soaps of relatively long-chain carboxylic acids. Familiar examples are stearates and oleates. Alkyl benzoic acids are also included under metal soaps. Metals that may be mentioned are Li, Na, K, Mg, Zn, and Al. Use is often made of what are known as synergistic mixtures, such as magnesium/zinc, calcium/zinc, or calcium/magnesium/zinc stabilizers. The metal soaps can be employed individually or in mixtures.

Specific examples which may be mentioned are the zinc and magnesium salts of monovalent carboxylic acids such as acetic, propionic, butyric, valeric, hexanoic, enanthic, octanoic, neodecanoic, 2-ethylhexanoic, pelargonic, decanoic, undecanoic, dodecanoic, tridecanoic, myristic, palmitic, isostearic, stearic, 12-hydroxystearic, behenic, benzoic, p-tert-butylbenzoic, 3,5-di-tert-butyl-4-hydroxybenzoic, toluic, dimethylbenzoic, ethylbenzoic, n-propylbenzoic, salicylic, p-tert-octysalicylic; magnesium and zinc salts of the monoesters of divalent, carboxylic acids such as malonic, succinic, glutaric, adipic, fumaric, pentane-1,5-dicarboxylic, hexane-1,6-dicarboxylic, heptane-1,7-dicarboxylic, octane-1,8-dicarboxylic, sorbic, phthalic, isophthalic, terephthalic and hydroxyphthalic acid; and of the di- or triesters of the tri- or tetravalent carboxylic acids such as hemimellitic, trimellitic, pyromellitic and citric acid. Preference is given to magnesium and zinc carboxylates of carboxylic acids having 7 to 18 carbon atoms (metal soaps in the narrow sense), such as, for example, benzoates or alkanoates, preferably stearate, oleate, laureate, palmitate, behenate, hydroxystearates, dihydroxystearates or 2-ethylhexanoate. Particular preference is given to stearate, oleate and p-tert-butylbenzoate. Overbased carboxylates, such as overbased zinc octoate may also be used. If desired, it is also possible to employ a mixture of carboxylates of different structures. Preference is given to compositions containing a zinc compound. Alkyltin mercapto carboxylates or carboxylates can also be used as additional heat stabilizers, preferably mono or di methyl, butyl, octyl tin derivatives with alkyl thioglycolates, alkyl mercaptopropionates and carboxylates.

The additive herein may also be advantageously combined with metal perchlorates, preferred perchlorates being sodium, lithium, potassium, calcium, aluminum, zinc and magnesium perchlorates, in known and conventional amounts.

Examples of fillers can be one or more of the group consisting of calcium carbonate, dolomite, wollastonite, magnesium oxide, magnesium hydroxide, silicates, clay, talc, glass fibers, glass beads, wood flour, mica, metal oxides, metal hydroxides, carbon black, graphite, rock flour, heavy spar, glass fibers, talc, kaolin and chalk. The fillers can be employed in an amount of preferably at least 1 part, for example, from 5 to 200, judiciously from 10 to 150 and in particular, from 15 to 100 parts by weight per 100 parts by weight of PVC.

Examples of lubricants can be selected from the group consisting of montan wax, fatty acids, fatty acid esters, PE waxes, amide waxes, chlorinated paraffins, glycerol esters, fatty ketones, silicone-based lubricants and combinations thereof. Calcium stearate is preferred.

Examples of plasticizers can be selected from the group consisting of phthalates, esters of aliphatic dicarboxylic acids, trimellitates, citrates, epoxy plasticizers, polymer placticizers, phosphoric esters, paraffins, hydrocarbons, monoesters, pentaerythritol esters and glycol esters.

Examples of pigments can be selected from the group consisting of $TiO_2$ zirconium oxide-based pigments, $BaSO_4$, zinc oxide (zinc white) and lithopones (zinc sulfide/barium sulfate), carbon black, carbon black/titanium dioxide mixtures, iron oxide pigments, $Sb_2O_3$, (Ti, Ba, Sb) $O_2$, $Cr_2O_3$ spinels, such as cobalt blue and cobalt green, Cd (S, Se), ultramarine blue, organic pigments for example, azo pigments, phthalo-cyanine pigments, quinacridone pigments, perylene pigments, diketopyrrolopyrrole pigments and anthraquinone pigments.

The polymers or resins to which the complexes of this invention are added, optionally in combination with one or more known or conventional additives, are the halogen-containing organic polymers. These polymers include homopolymers such as the polyvinyl chloride-type polymers, e.g., polyvinyl chloride and polyvinylidene chloride. These polymers can also include copolymers formed by the copolymerization of vinyl chloride with other unsaturated monomers. Unsaturated monomers can be compounds which contain polymerizable carbon-to-carbon double bonds and include alpha olefins such as ethylene, propylene and 1-hexene; acrylates, such as acrylic acid, ethyl acrylate, acrylonitrile; vinyl monomers, such as styrene, vinyl acetate and/or maleates such as maleic acid, maleic anhydride and maleic esters. Particularly preferred resins to which the compounds of this invention are added are the chlorine-containing polymers, particularly PVC, and compositions containing these resins. These polymers also include chlorinated polyolefins or chlorinated PVC.

The stabilized halogenated resins can then be employed as components of known products including, but not limited to, flexible PVC products such as insulation for wire and cable products and skin compositions for the surfaces of automotive interior panels, including those exhibiting low fog characteristics, i.e., a reduced tendency of the resin to volatilize, by which is meant that the resin emits a reduced amount of, and preferably little or no, compounds into the ambient atmosphere when the resin is exposed to moderate heat, typically temperatures ranging from about 60° C. to about 130° C. (140° F. to 270° F.). The resins can be also used in, but not limited to, rigid PVC products such as window profiles, pipes, and siding.

In order for the invention to be better understood, the following examples are given by way of illustration only.

EXAMPLE 1

CBDBM was prepared by a Claisen condensation of acetophenone and methylbenzoate using calcium oxide as the base. The condensation procedure consisted of heating acetophenone (270.3 g; 2.25 mol), methyl benzoate (1838 g; 13.5 mol), and calcium oxide (168.24 g; 2.7 mol) at 195–200° C. with stirring for 3.5 hours, in a 5 L round bottom flask, under a stream of nitrogen. During the reaction, methanol was collected by distillation. CBDBM was precipitated by successive addition, under vigorous stirring, of water (700 mL), heptane (700 mL), and after several minutes, 450 mL more of water. The precipitate was filtered under vacuum through a Buchner funnel with paper filter, and the material was washed several times with heptane (4,355 mL total washes) and dried under vacuum. 962.0 g of CBDBM was obtained, with a content of 42% DBM (measured by UV absorption of a solution in DMSO). This represents a yield of 80% for the condensation reaction, based on acetophenone. The content of calcium was 10.7%. The ratio of benzoate to DBM was 1.17 mol/mol.

80% of the heptane used was recovered by distillation. 1045.22 g of unreacted methyl benzoate was recovered by vacuum distillation (100–110° C. @ 15–20 mmHg) (85.3% recovery).

EXAMPLE 2

The reaction was carried out as in Example 1, on a 0.5 L scale. Acetophenone (30.05 g; 0.25 mol), methyl benzoate (204.2 g; 1.5 mol), and calcium oxide (18.7 g; 0.3 mol) were heated at 195–200° C. with stirring for 3.5 hours, in a 0.5 L round bottom flask, under a stream of nitrogen. During the reaction, methanol was collected by distillation. After the condensation, the reaction mixture (136.9 g) was stirred for a few minutes with heptane (250 mL). After decanting and separating the heptane, treating again with heptane (200 mL), filtering under vacuum, and washing three times with heptane (250 mL, 75 mL, 75 mL), 67.42 g of calcium DBM complex was obtained. UV analysis showed 40.17 weight % of DBM, which corresponds to a yield for the condensation of 83% based on acetophenone.

In Examples 3–8 below, the heat stability of several PVC formulations was examined using CBDBM as a replacement for barium intermediates. PVC sheets were milled at 170° C. and strips were tested using a Mathis oven at 190° C. and 204° C. Red, green and blue (RGB) reflectances were measured with a scanner, using FloScan software (Dr. Stapfer GmbH., Germany). RGB extinctions, which are proportional to the molar concentrations of double bonds, were calculated as previously described (R. Bacaloglu, U. Stewen, *J. Vinyl Additive Technol.* vol. 7, No. 3, 149–155 (2001)). The test controls were barium based commercial stabilizers available from Crompton Corp.

Dielectric strength measurements were carried out on dry and wet (soaked in water for 24 hours) press polished sheets.

EXAMPLE 3

Figure 1:
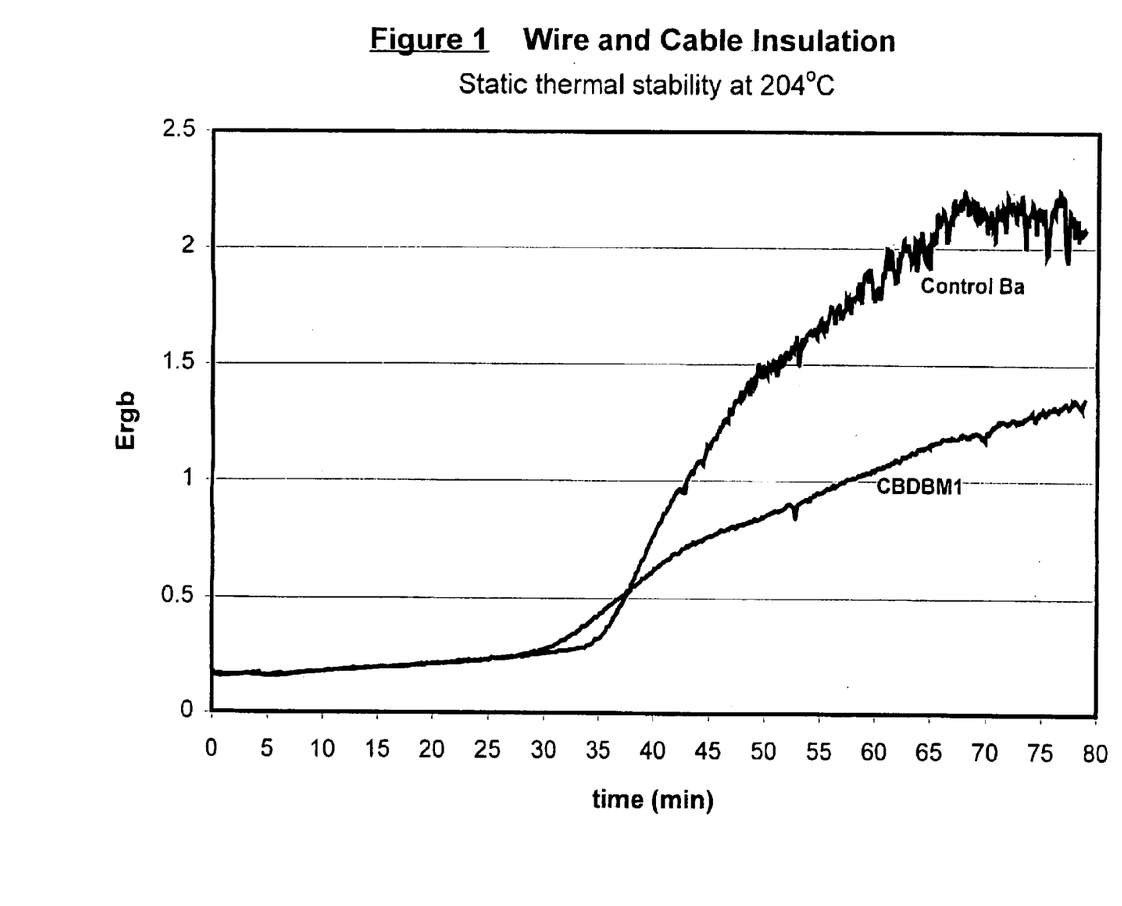
FIG. 1 shows the thermal stability of a PVC compound formulated for wire and/or cable insulation that contains 5 parts per hundred (phr) of a calcium/zinc stabilizer based on CBDBM. The same PVC compound containing a barium based stabilizer was used as a control.
Figure 2:
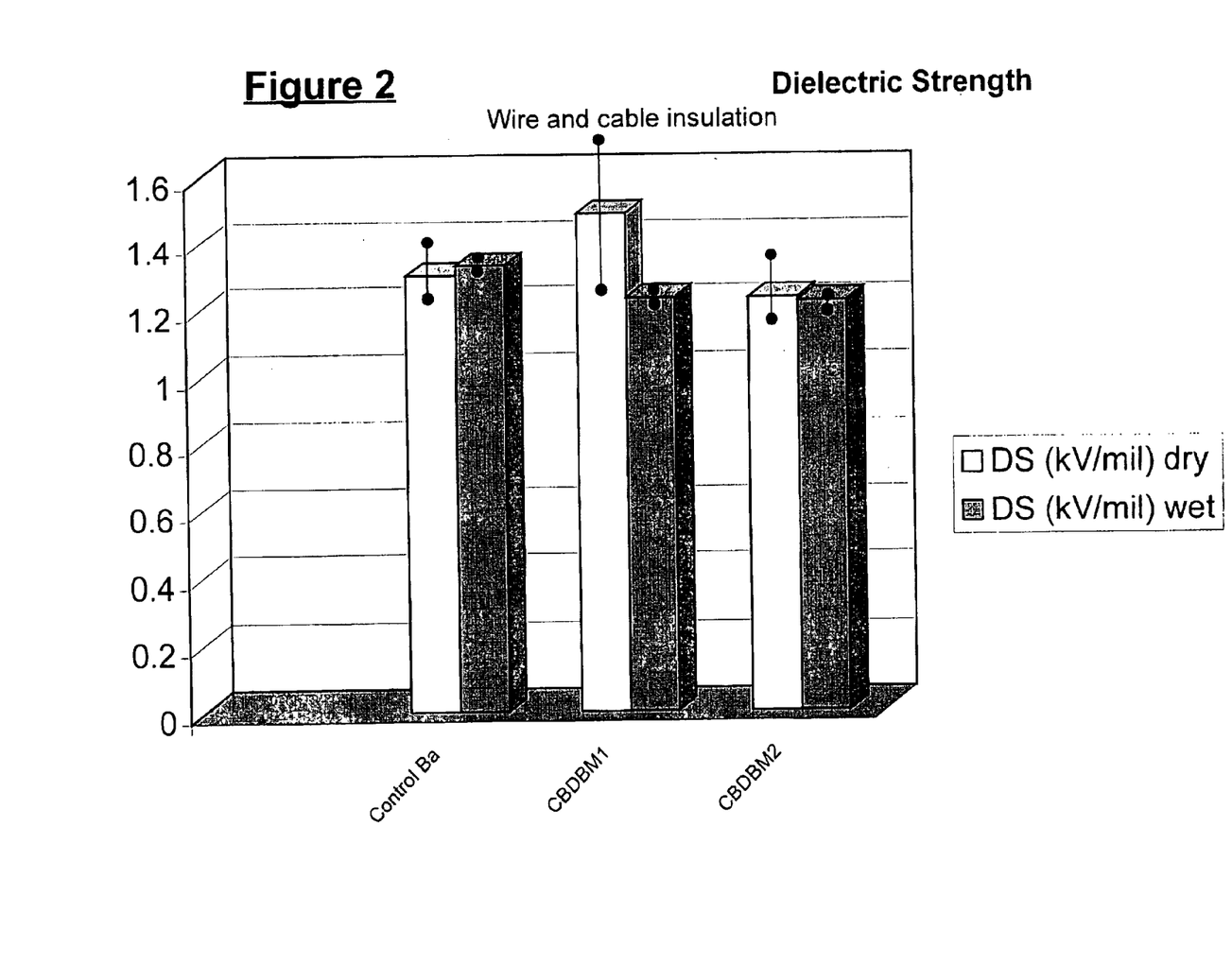
FIG. 2 shows the dielectric strength of a PVC compound formulated for wire and/or cable insulation that contains 5 phr of calcium/zinc stabilizer based on CBDBM. The same PVC compound containing a barium based stabilizer was used as a control.

Wire and Cable Application 5 phr of a calcium/zinc stabilizer based on CBDBM was added to PVC compound. A barium based stabilizer was used as a control. PVCs treated with these stabilizers were heated to a temperature of 204° C. and discoloration (Ergb) of the PVC compounds was determined over time; the results of these measurements are set forth in FIG. 1. The dielectric strengths of the PVC compounds containing these stabilizers are set forth in FIG. 2.

EXAMPLE 4

Figure 3:
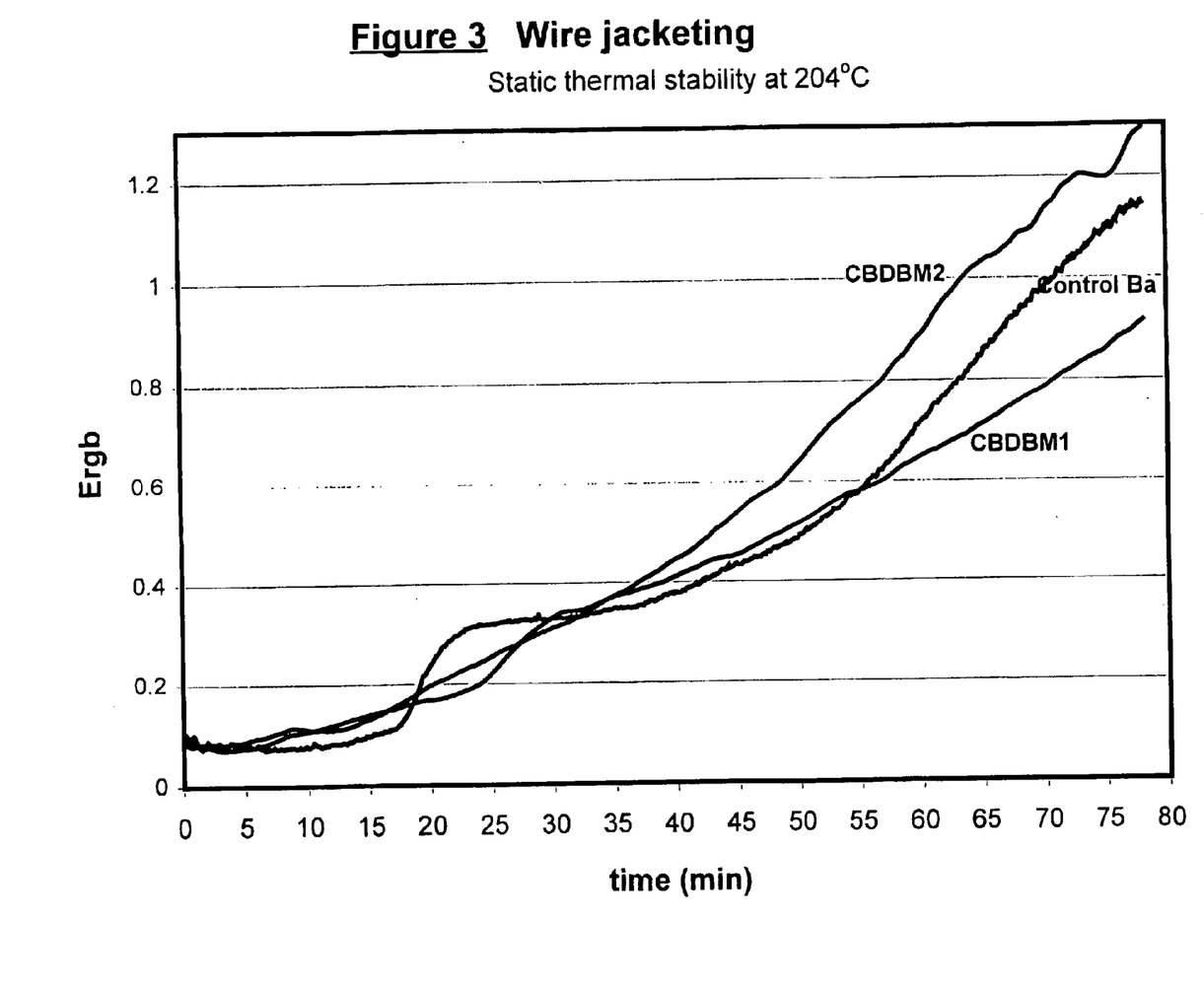
FIG. 3 shows the thermal stability of a PVC compound formulated for wire jacketing that contains 3 phr of calcium/zinc stabilizer based on CBDBM. The same PVC compound treated with a barium based stabilizer was used as a control.
Figure 4:
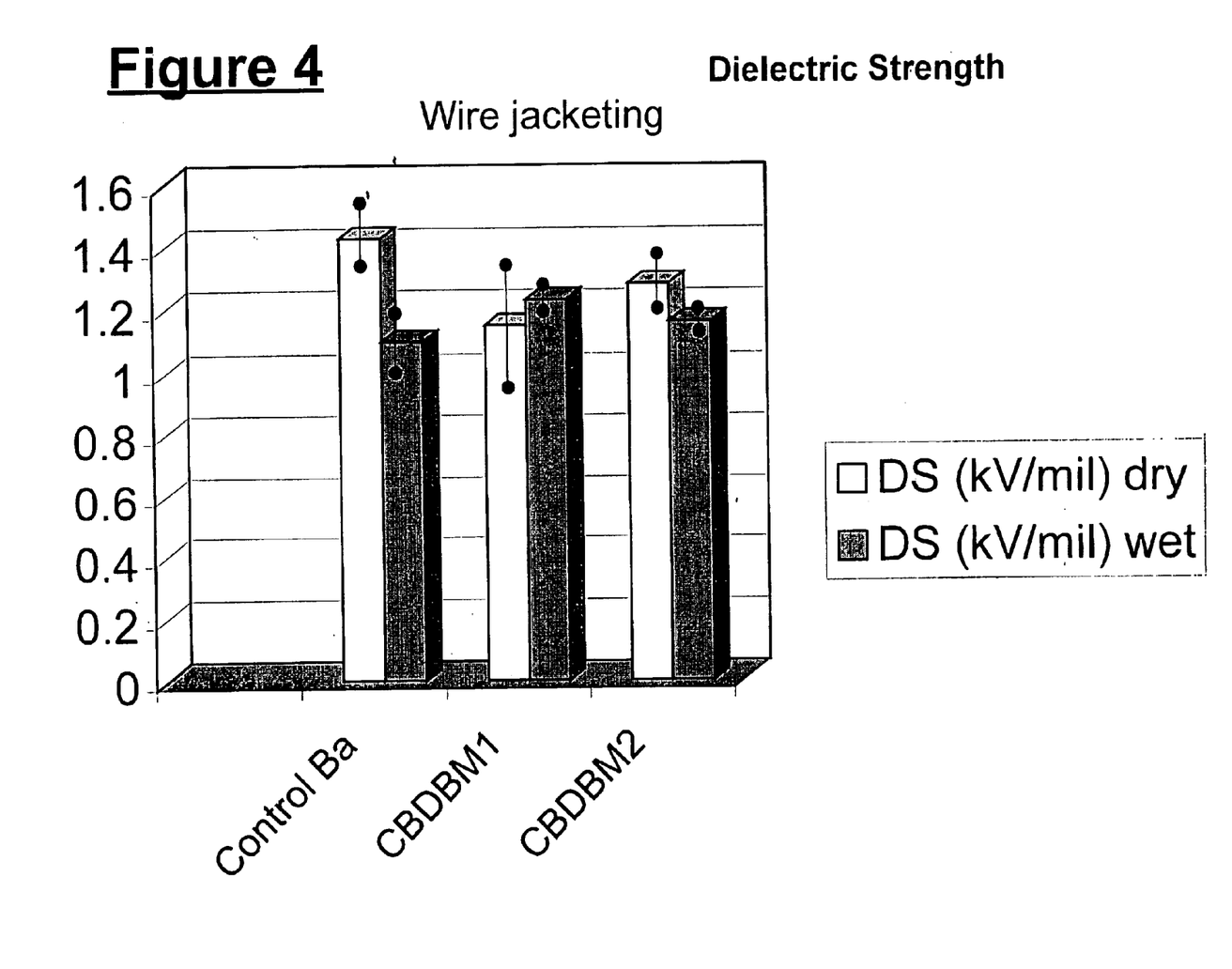
FIG. 4 shows the dielectric strength of a PVC compound formulated for wire jacketing that contains 3 phr of calcium/zinc stabilizer based on CBDBM. The same PVC compound containing a barium based stabilizer was used as a control.

Wire Jacketing Application 3 phr of two calcium/zinc stabilizers based on CBDBM Stabilizer were added to PVC compound. A barium based stabilizer was used as a control. PVC compounds containing these stabilizers were heated to a temperature of 204° C. and the discoloration (Ergb) of the PVCs was determined over time; the results of these measurements are set forth in FIG. 3. The dielectric strengths of the PVC compounds containing these stabilizers are set forth in FIG. 4.

EXAMPLE 5

Figure 5:
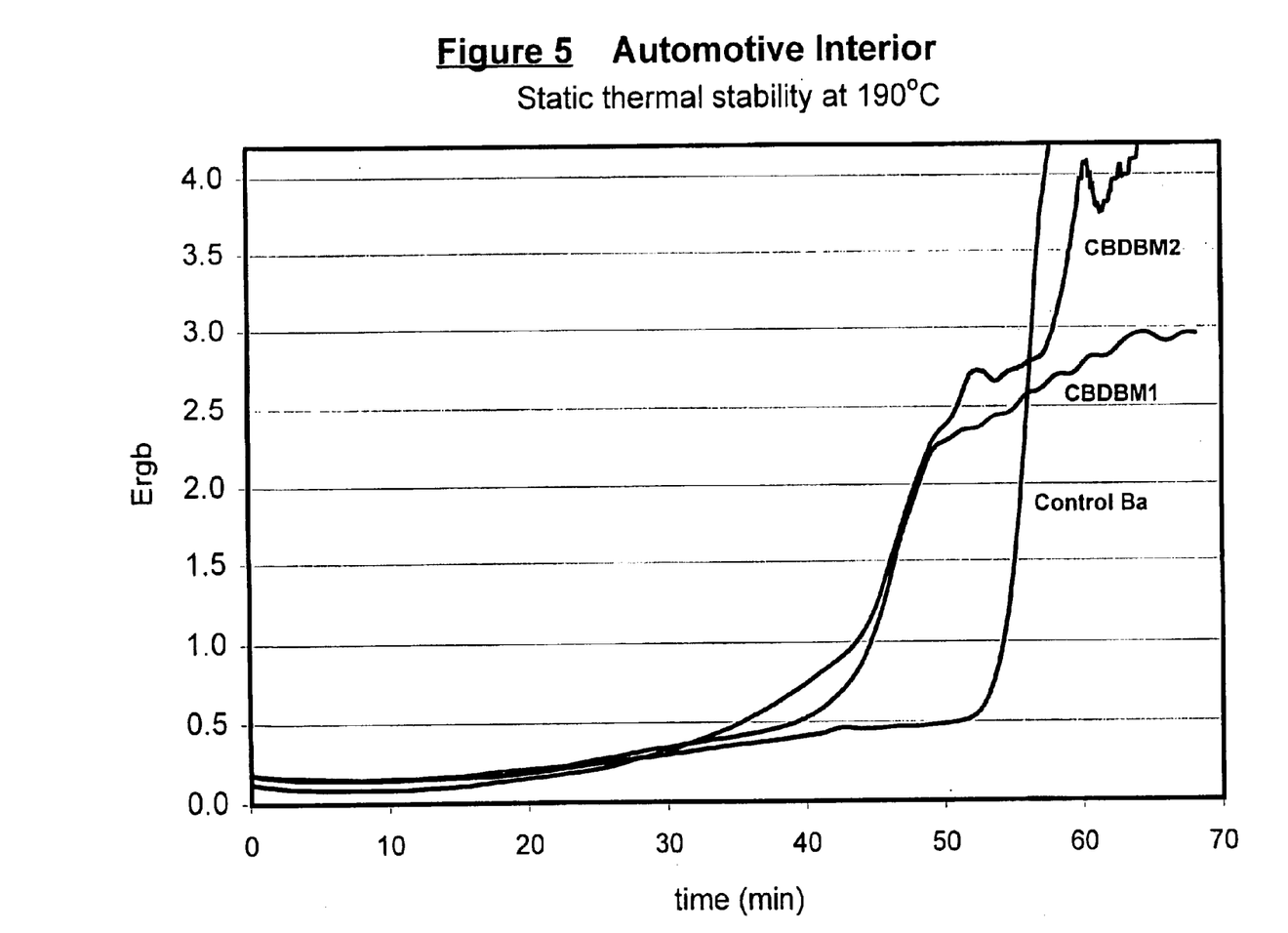
FIG. 5 shows the thermal stability of a PVC compound formulated for use in an automotive interior that contains 2 phr of calcium/zinc stabilizer based on CBDBM. The same PVC compound containing a barium based stabilizer was used as a control.

Automotive Interior Application 2 phr of two calcium/zinc stabilizers based on CBDBM Stabilizer were added to PVC compound. A barium based stabilizer was used as a control. PVC compounds containing these stabilizers were heated to a temperature of 190° C. and the discoloration (Ergb) of the PVCs was determined over time; the results of these measurements are set forth in FIG. 5.

EXAMPLE 6

Figure 6:
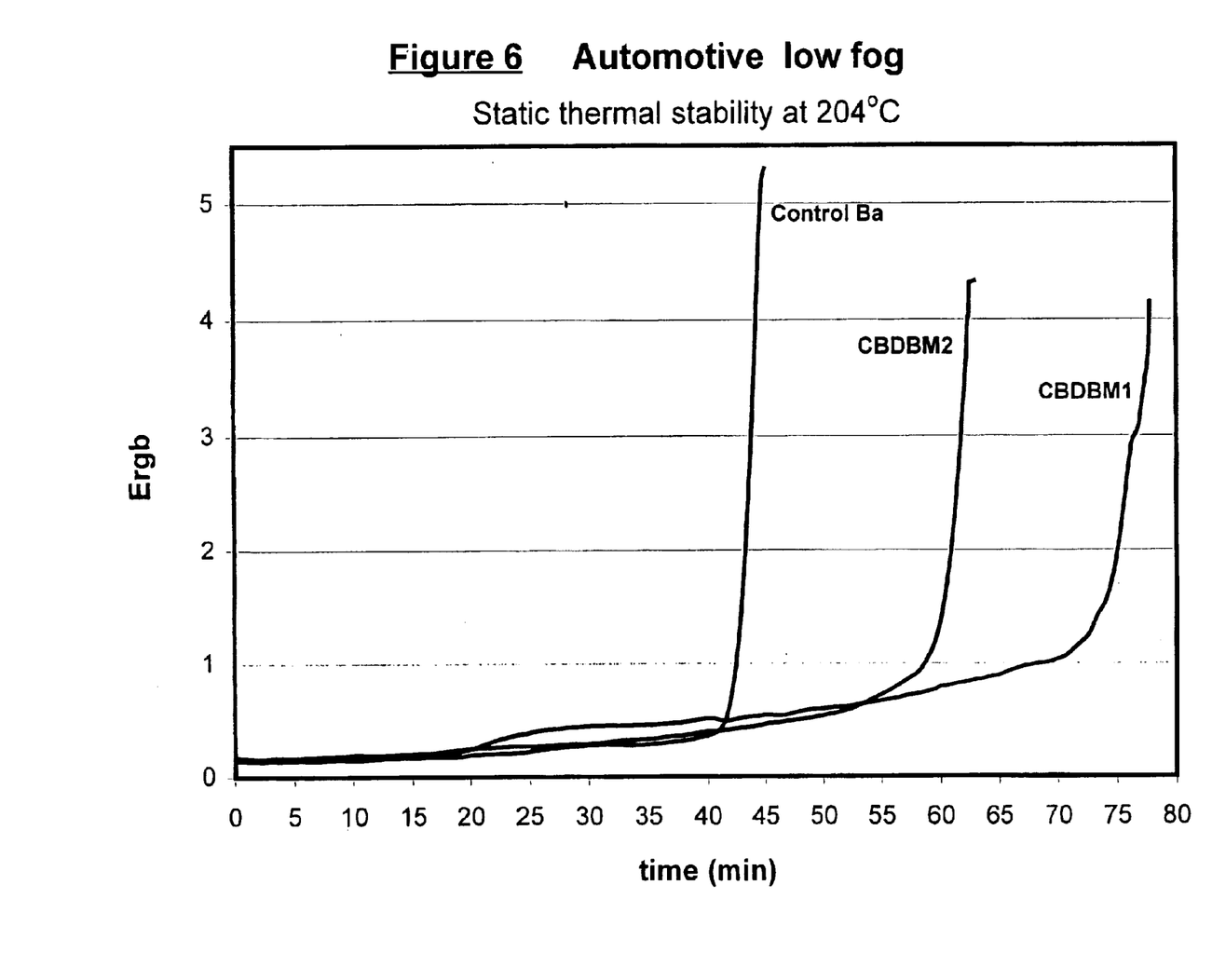
FIG. 6 shows the thermal stability of a PVC compound formulated for use in automotive interiors having low fog characteristic that contains 2 phr of calcium/zinc stabilizers based on CBDBM. The same PVC compound containing a barium based stabilizer was used as a control.

Automotive Low Fog Application 2 phr of two calcium/zinc stabilizers based on CBDBM Stabilizer were added to a PVC compound. A barium based stabilizer was used as a control. PVC compounds containing these stabilizers were heated to a temperature of 204° C. and the discoloration of the PVCs (Ergb) was determined over time; the results of these measurements are set forth in FIG. 6.

EXAMPLE 7

Figure 7:
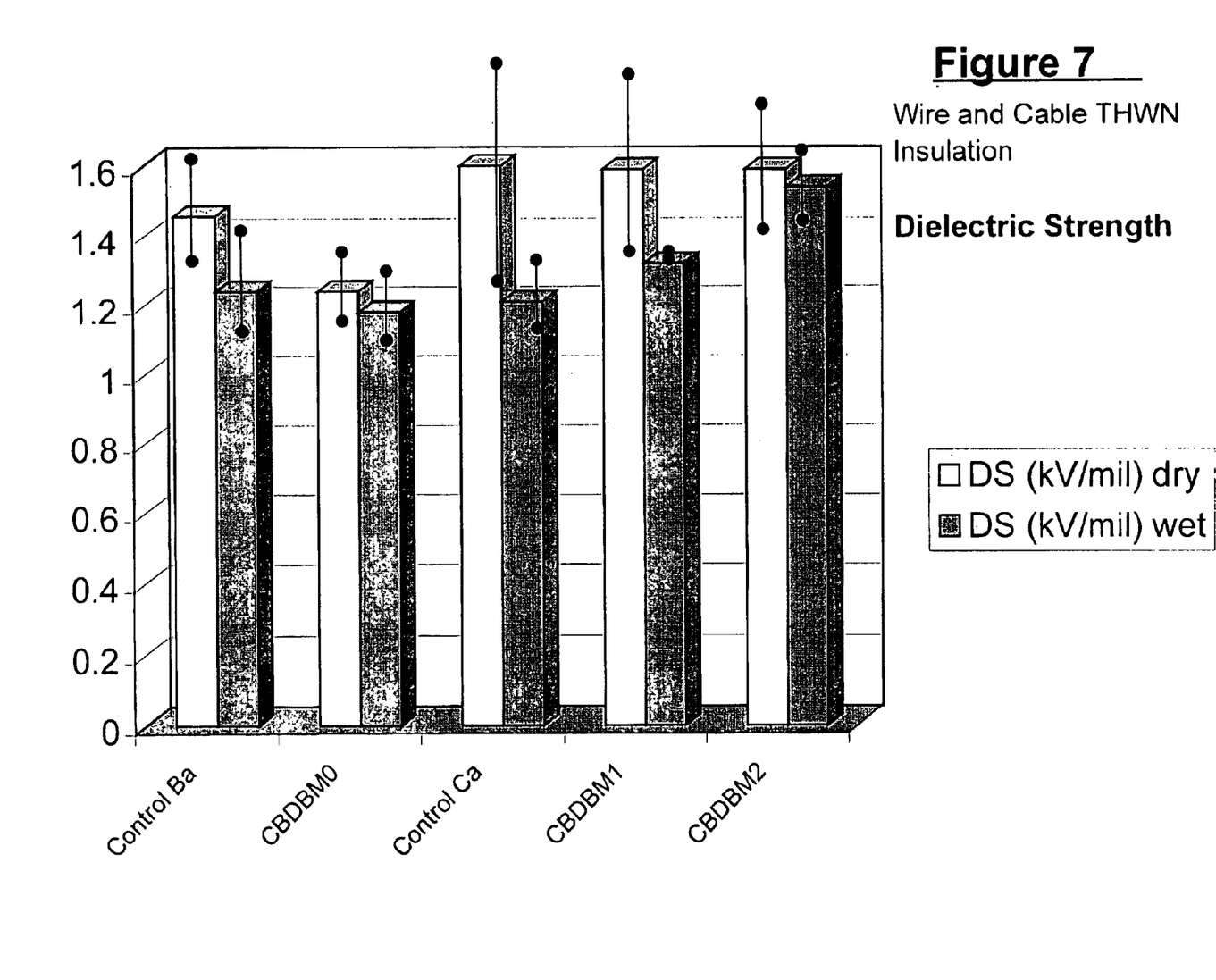
FIG. 7 shows the dielectric strength of a PVC compound formulated for wire and THWN cable (Thermoplastic High temperature Wet Nylon-coated) flame retardant, moisture and heat resistant thermoplastic insulation that contains 5 phr of CBDBM based stabilizers. Barium and calcium based stabilizers were used as controls.

Wire and Cable THWN Insulation Application 5 phr of three calcium/zinc stabilizers based on CBDBM Stabilizer were added to a PVC compound. A barium based stabilizer and a calcium based stabilizer were used as controls. The dielectric strengths of PVCs treated with these stabilizers are set forth in FIG. 7.

EXAMPLE 8

Wire and Cable Application

Figure 8:
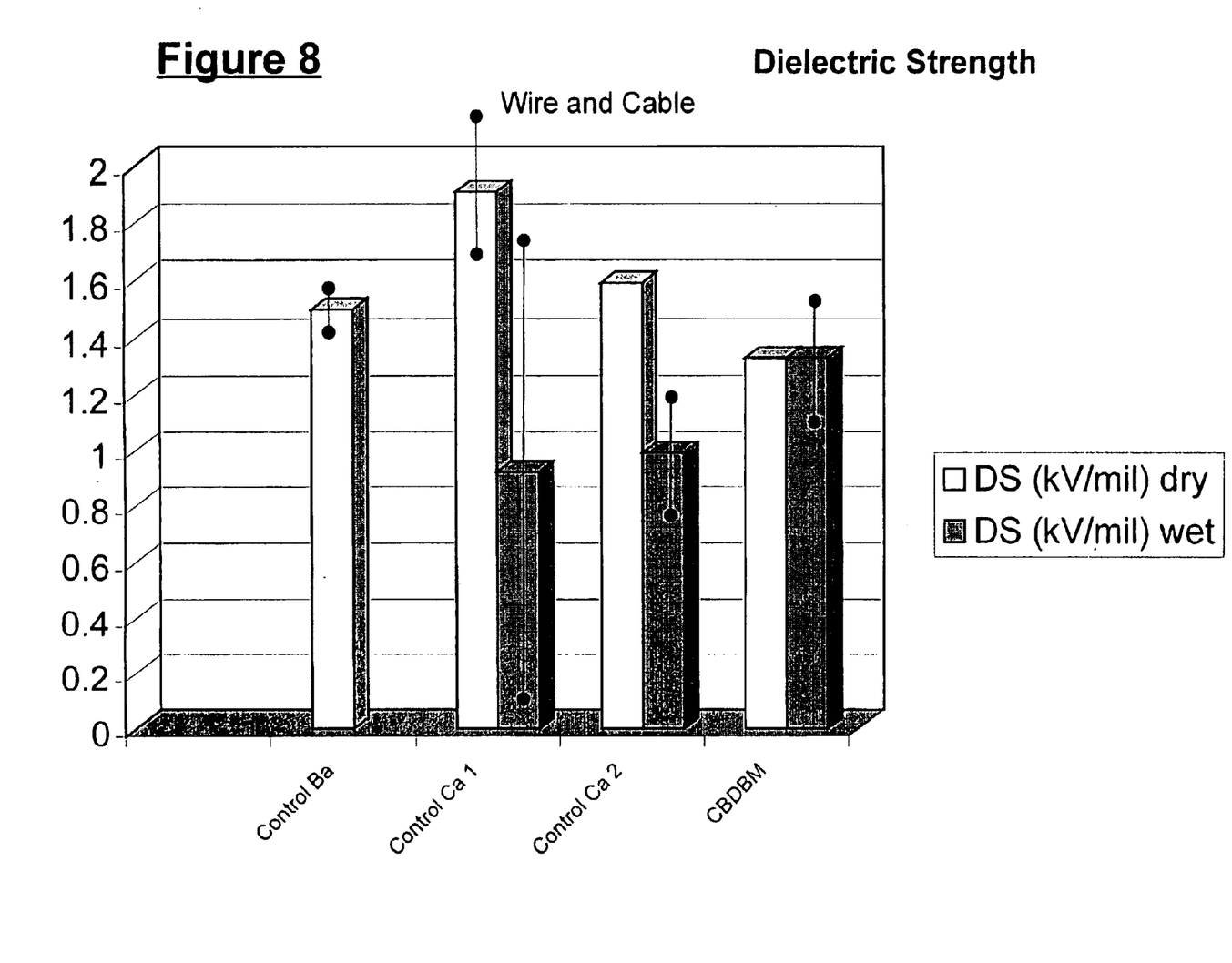
FIG. 8 shows the dielectric strength of a PVC compound formulated for wire and cable insulation that contains 4.5 phr of a CBDBM based stabilizer. Barium and two calcium based stabilizers were used as controls.

4.5 phr of a stabilizer based on CBDBM was added to a PVC compound. A barium based stabilizer and two calcium based stabilizers were used as controls. The dielectric strengths of PVCs treated with these stabilizers are set forth in FIG. 8.

It will be understood that various modifications may be made to the embodiments disclosed herein. Therefore, the above description should not be construed as limiting, but merely as exemplifications of preferred embodiments. Those skilled in the art will envision other modifications within the scope and spirit of the claims appended hereto.

What is claimed is:

1. A method of preparing a stabilizer complex which comprises reacting:

a) a ketone of the structure:

where $R_1$ and $R_2$ are selected from the group consisting of H, methyl, $C_1$–$C_{20}$ alkyl, $C_2$–$C_{20}$ alkenyl, aryl, aryl that is mono or poly substituted with $C_1$–$C_{15}$ alkyl, $C_1$–$C_4$ alkoxy, and phenylalkyl;

b) an ester of the structure:

where $R_4$ is selected from the group consisting of $C_1$–$C_5$ alkyl, aryl, and aryl that is substituted with $C_1$–$C_4$ alkyl, and $R_3$ is selected from the group consisting of aryl, substituted aryl, $C_1$–$C_{20}$ alkyl, and $C_2$–$C_{20}$ alkenyl;

c) a base selected from the group consisting of calcium oxide, calcium hydroxide, barium oxide, barium hydroxide, potassium hydroxide, potassium oxide, sodium hydroxide and sodium oxide in the presence of a solvent selected from the group consisting of an aromatic hydrocarbon, alkyl or aryl ether, dialkylsulfoxide, or the same ester used for the reaction, to form a reaction mixture containing a stabilizer complex, d) contacting the reaction mixture containing the stabilizer complex with water, organic solvent or combination thereof to precipitate the stabilizer complex from the reaction mixture; and e) recovering the stabilizer complex, which is a salt of a metal selected from the group consisting of sodium, potassium, calcium and barium.

2. The method according to claim 1 wherein the reaction mixture containing the stabilizer complex is contacted with water to dissolve unreacted components and precipitate the stabilizer complex from the reaction mixture.

3. The method according to claim 1 wherein the reaction mixture containing the stabilizer complex is contacted with organic solvent to remove unreacted components and to precipitate the stabilizer complex from the reaction mixture.

4. The method according to claim 3 wherein the organic solvent is heptane.

5. A method of preparing a stabilizer complex which comprises:

a) reacting acetophenone with methyl benzoate and calcium oxide to provide a stabilizer complex precipitate;

b) contacting the reaction mixture containing the stabilizer complex with water to dissolve unreacted calcium oxide as $Ca(OH)_2$ and precipitate additional stabilizer complex from the reaction mixture;

c) contacting the reaction mixture containing the stabilizer complex with organic solvent to remove methyl benzoate present on the stabilizer complex and precipitate additional the stabilizer complex from the reaction mixture; and, d) recovering the stabilizer complex which is substantially free of unreacted $Ca(OH)_2$ and methyl benzoate.

6. The method according to claim 5 wherein the organic solvent is heptane.

7. The method according to claim 1 wherein the reaction mixture containing the stabilizer complex is contacted with water and organic solvent.

* * * * *